US010627966B2

(12) United States Patent
 Na

(10) Patent No.: US 10,627,966 B2
(45) Date of Patent: Apr. 21, 2020

(54) IN-CELL TOUCH ORGANIC LIGHT-EMITTING DISPLAY DEVICE AND DRIVING CIRCUIT THEREOF

(71) Applicant: Silicon Works Co., Ltd., Daejeon (KR)

(72) Inventor: Young Sun Na, Gyeonggi-do (KR)

(73) Assignee: Silicon Works Co., Ltd., Daejeon (KR)

(*) Notice: Subject to any disclaimer, the term of this patent is extended or adjusted under 35 U.S.C. 154(b) by 51 days.

(21) Appl. No.: 15/786,524

(22) Filed: Oct. 17, 2017

(65) Prior Publication Data

US 2018/0113531 A1    Apr. 26, 2018

(30) Foreign Application Priority Data

Oct. 20, 2016    (KR) .................... 10-2016-0136319

(51) Int. Cl.
| | |
|---|---|
| *G06F 3/041* | (2006.01) |
| *G06F 3/044* | (2006.01) |
| *G09G 3/20* | (2006.01) |
| *G09G 3/3225* | (2016.01) |
| *G09G 3/3266* | (2016.01) |
| *G09G 3/3275* | (2016.01) |

(52) U.S. Cl.
CPC ............ *G06F 3/044* (2013.01); *G06F 3/0412* (2013.01); *G09G 3/2092* (2013.01); *G09G 3/3225* (2013.01); *G09G 3/3266* (2013.01); *G09G 3/3275* (2013.01); *G09G 2300/0814* (2013.01); *G09G 2354/00* (2013.01)

(58) Field of Classification Search
CPC ..... G06F 3/044; G06F 3/0412; G09G 3/3266; G09G 3/2092; G09G 3/3225; G09G 3/3275; G09G 2354/00; G09G 2300/0814
See application file for complete search history.

(56) References Cited

U.S. PATENT DOCUMENTS

| | | | |
|---|---|---|---|
| 2015/0130865 A1* | 5/2015 | Shim .................... | G09G 3/3233 345/694 |
| 2016/0216800 A1* | 7/2016 | Cho ........................ | G06F 3/044 |
| 2017/0068360 A1* | 3/2017 | Yuan ....................... | G06F 3/047 |
| 2018/0232088 A1* | 8/2018 | Gallardo ............... | G06F 3/0412 |

FOREIGN PATENT DOCUMENTS

| | | |
|---|---|---|
| KR | 10-1324458 B | 10/2013 |
| KR | 10-1476434 B | 12/2014 |
| KR | 10-1719418 B | 3/2017 |

* cited by examiner

*Primary Examiner* — Amit Chatly
(74) *Attorney, Agent, or Firm* — Fenwick & West LLP

(57) ABSTRACT

The present disclosure provides technology for an in-cell organic light-emitting display device. The present disclosure enables one component of an organic light-emitting display device to be used not only for a display operation but also for a touch operation, thus achieving an in-cell organic light-emitting display device.

12 Claims, 11 Drawing Sheets

IN-CELL TOUCH ORGANIC LIGHT-EMITTING DISPLAY DEVICE AND DRIVING CIRCUIT THEREOF

CROSS-REFERENCE TO RELATED APPLICATIONS

This patent application claims priority from Republic of Korea Patent Application No. 10-2016-0136319, filed on Oct. 20, 2016, which is hereby incorporated by reference in its entirety.

BACKGROUND

1. Field of Technology

The present disclosure relates to a technique for sensing a touch of an object in an organic light-emitting display device.

2. Description of the Prior Art

A technique of recognizing an object approaching or touching a touch panel is referred to as a touch-sensing technique.

Since a touch panel and a display panel are disposed on the same plane, users can input a user manipulation signal to the touch panel while an image on the display panel. This user manipulation method provides improved user intuitiveness compared to other previous user manipulation methods, for example, mouse input or keyboard input methods.

Due to this advantage, a touch panel is disposed in various electronic devices including a display panel.

A touch panel may be completely separated from a display panel depending on the type thereof. For example, in an add-on type, a touch panel and a display panel are separated.

On the other hand, a touch panel and a display panel can be configured in an integrated form such that the panels share some components with each other. This type of display device is also referred to as an in-cell display device. In the in-cell display device, the touch panel and the display panel share some components, thereby reducing the overall thickness of the panel and reducing manufacturing costs.

In order to configure an in-cell display device, some components of a display panel need to be utilized as components for a touch panel. In a liquid crystal display (LCD), a common electrode that supplies a common voltage is disposed on a display panel. This common electrode is utilized as a touch electrode of a touch panel, thus configuring an in-cell display device.

Although it is also required to develop an in-cell display for an organic light-emitting display device in order to reduce the overall thickness of a panel and to reduce manufacturing costs, a panel structure for sharing components and a method for driving the panel have not been proposed.

SUMMARY

An aspect of the present embodiment is to provide a technique for an in-cell organic light-emitting display device. Another aspect of the present embodiment is to provide a technique for a driving circuit for an in-cell organic light-emitting display device.

To achieve the foregoing aspects, one embodiment provides an organic light-emitting display device including a panel and a driving circuit.

In this organic light-emitting display device, a driving transistor configured to control a driving power for an organic light-emitting diode according to a data voltage supplied through a data line and a switching transistor configured to control a connection between an anode electrode of the organic light-emitting diode and the data line may be disposed in each pixel in the panel.

The driving circuit may supply the data voltage to the driving transistor through the data line in a display period and may supply a touch-driving signal to the data line connected to the anode electrode by the switching transistor in a touch period.

Another embodiment provides a driving circuit including a data-driving circuit and a touch-driving circuit.

In the driving circuit, the data-driving circuit may generate a data voltage according to image data and may supply the data voltage to a data line in a display period.

The touch-driving circuit may supply a touch-driving signal to the data line connected to an anode electrode of an organic light-emitting diode disposed in each pixel and may sense the proximity or touch of an object to a panel according to a touch response signal received from the anode electrode in a touch period.

Another embodiment provides an organic light-emitting display device including a panel and a driving circuit.

In this organic light-emitting display device, a plurality of sensing lines connected to an anode electrode of an organic light-emitting diode disposed in each pixel may be disposed in the panel.

The driving circuit may receive a sensing signal for measuring a characteristic value of the pixel through the sensing lines in a sensing period and may supply a touch-driving signal to the anode electrode through the sensing lines in a touch period.

As described above, according to the present embodiments, an organic light-emitting display device may be configured in an in-cell type. Accordingly, the overall thickness of a panel of the organic light-emitting display device may be reduced, and manufacturing costs may be reduced.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
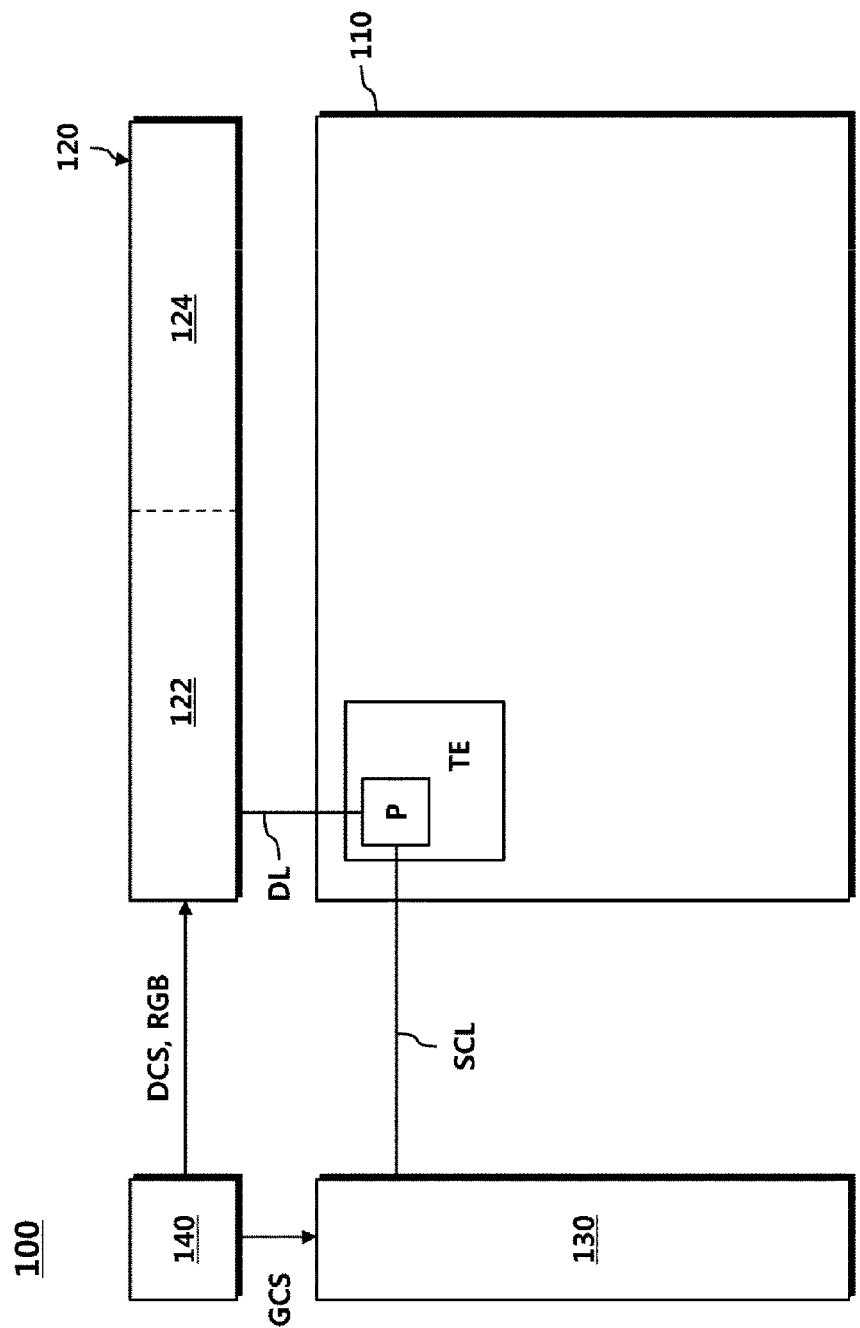
FIG. 1 schematically illustrates a display device according to an embodiment.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it is determined that the description may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 schematically illustrates a display device according to an embodiment.

Referring to FIG. 1, the display device 100 may include a panel 110, a touch display-driving circuit 120, a gate-driving circuit 130, and a timing control circuit 140. The touch display-driving circuit 120 may include a data-driving circuit 122 and a touch-driving circuit 124.

A plurality of data lines DL connected to the touch display-driving circuit 120 and a plurality of scan lines SCL connected to the gate-driving circuit 130 may be formed in the panel 110. Further, a plurality of pixels P corresponding to the intersections of the plurality of data lines DL and the plurality of scan lines SCL may be disposed in the panel 110. In addition, a plurality of touch electrodes TE may be formed in the panel 110. One pixel P or a plurality of pixels P may be disposed in an area where the touch electrode TE is disposed.

The panel 110 may include a display panel and a touch panel (TSP: touch screen panel), wherein the display panel and the touch panel may share some components. Specifically, an anode electrode of an organic light-emitting diode disposed in each pixel P in the display panel may be used as the touch electrode TE for the touch panel. Although this panel 110 is also referred to as an integrated panel or an in-cell panel in that the display panel and the touch panel share some components with each other, the present embodiment is not limited to this term.

The data-driving circuit 122 supplies a data voltage to the data lines DL. The data voltage may be generated according to image data (RGB) received from the timing control circuit 140.

The gate-driving circuit 130 may sequentially supply a scan signal to the scan lines SCL. The gate-driving circuit 130 may be disposed at one side of the panel 110, as in FIG. 1, or may be divided into two parts so as to be disposed at both sides of the panel 110 depending on the driving method.

The touch-driving circuit 124 may supply a touch-driving signal to the touch electrodes TE and may detect the proximity or touch of an object to the panel 110 according to a touch response signal of the touch electrode TE with respect to the touch-driving signal.

Although the touch-driving circuit 124 may be a separate component from the data-driving circuit 122 and the gate-driving circuit 130, which may be provided outside the data-driving circuit 122 and the gate-driving circuit 130, the touch-driving circuit 124 may be provided as an internal component of a separate driver integrated circuit including at least one of the data-driving circuit 122 and the gate-driving circuit 130 depending on the configuration method. The touch-driving circuit 124 may be provided as an internal component of the data-driving circuit 122 or the gate-driving circuit 130. Although FIG. 1 shows an example in which the data-driving circuit 122 and the touch-driving circuit 124 are provided in a single touch display-driving circuit 120, the present embodiment is not limited thereto.

The timing control circuit 140 supplies various control signals to the data-driving circuit 122, the touch-driving circuit 124, and the gate-driving circuit 130.

The timing control circuit 140 may output a data control signal DCS and a gate control signal GCS based on a vertical/horizontal synchronization signal and an image signal, which are input from a host and an external timing signal such as a clock signal. In addition, the timing control circuit 140 may supply image data (RGB), obtained by converting an image signal input from the host, to the data-driving circuit 122.

The data-driving circuit 122 may convert image data (RGB) into a data voltage, which is a voltage value corresponding to a grayscale value, and may supply the data voltage to the data lines DL in response to a data control signal DCS and the image data (RBG) input from the timing control circuit 140. The gate-driving circuit 130 may sequentially supply a scan signal to the scan lines SCL in response to a gate control signal GCS input from the timing control circuit 140.

The display device 100 may employ a capacitive touch mode of sensing the proximity or touch of an object by detecting a change in capacitance of a touch electrode TE. The capacitive touch mode may be classified, for example, into a mutual capacitive touch mode and a self-capacitive touch mode.

In the mutual capacitive touch mode, a touch-driving signal is supplied to one touch electrode (TX electrode) and a touch response signal is received from another touch electrode (RX electrode) coupled with the TX electrode. The touch response signal received from the RX electrode varies depending on the proximity or touch of a finger, a pen, or the like. The mutual capacitive touch mode may detect the occurrence of a touch on the panel 110 and the coordinates of a touch using this touch response signal.

In the self-capacitive touch mode, a touch-driving signal is supplied to one touch electrode TE and a touch response signal is received from the one touch electrode TE. The touch response signal received from the one touch electrode TE varies depending on the proximity or touch of a finger, a pen, or the like. The self-capacitive touch mode may detect the occurrence of a touch on the panel 110 and the coordinates of a touch using this touch response signal.

The display device 100 may adopt one of the foregoing two capacitive touch modes (the mutual capacitive touch mode and the self-capacitive touch mode). In the present specification, for convenience of description, embodiments will be described on the assumption that the self-capacitive touch mode is employed.

The display device 100 may use an anode electrode of an organic light-emitting diode disposed in each pixel as a touch electrode TE and may recognize the proximity or touch of an object to the panel 110 by sensing the capacitance of the touch electrode TE or a change in the capacitance of the touch electrode TE.

Figure 2:
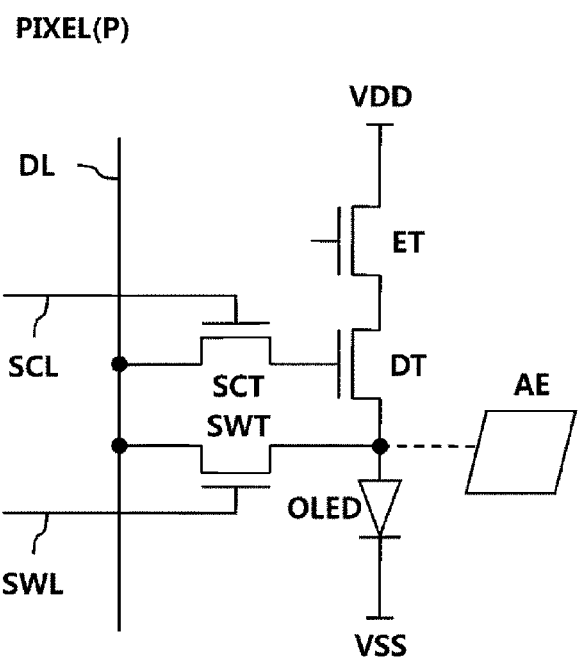
FIG. 2 illustrates the structure of a pixel according to an embodiment.

FIG. 2 illustrates the structure of a pixel according to an embodiment.

Referring to FIG. 2, an organic light-emitting diode OLED is disposed in the pixel P.

A plurality of transistors is disposed in the pixel P. Among the plurality of transistors, a driving transistor DT having one side electrically connected to an anode electrode AE of the organic light-emitting diode OLED controls driving power for the organic light-emitting diode OLED according to a data voltage supplied through a data line DL. The data voltage determines a gate-source voltage of the driving transistor DT, and the level of the driving power supplied to the organic light-emitting diode OLED through the driving transistor DT is controlled according to the gate-source voltage of the driving transistor DT. The organic light-emitting diode OLED adjusts a gray scale level according to the level of the driving power.

Among the plurality of transistors disposed in the pixel P, an emission transistor ET controls connection between the pixel P and a driving power source VDD. When the emission transistor ET is turned on, the driving power source VDD may supply power to the pixel P. When the emission transistor ET is turned off, the driving power source VDD may be disconnected from the pixel P. When the emission transistor ET is turned off, the driving power source VDD stops supplying power to the pixel P, so that the organic light-emitting diode OLED is turned off. With regard to positional arrangement, the emission transistor ET may be disposed between the driving transistor DT and the driving power source VDD.

Among the plurality of transistors disposed in the pixel P, a scan transistor SCT controls connection between the data line DL and the driving transistor DT. When the scan transistor SCT is turned on, the data line DL is connected to a gate electrode of the driving transistor DT. A data voltage may be supplied to the data line DL in a display period, in which the data line DL may be connected to the gate electrode of the driving transistor DT so that the driving transistor DT may control the driving power of the organic light-emitting diode OLED. The scan transistor SCT may be controlled to be turned on and off by a scan signal supplied through a scan SCL. The scan line SCL may be connected to a gate electrode of the scan transistor SCT, and the scan signal may be supplied from a gate-driving circuit.

Among the plurality of transistors disposed in the pixel P, a switching transistor SWT controls connection between the anode electrode AE of the organic light-emitting diode OLED and the data line DL. When the switching transistor SWT is turned on, the data line DL is connected to the anode electrode AE. A touch-driving signal may be supplied to the data line DL in a touch period, in which the data line DL is connected to the anode electrode AE so that the touch-driving signal is supplied to the anode electrode AE, and the anode electrode AE may be used as a touch electrode. The switching transistor SWT may be controlled to be turned on and off by a switching signal supplied through a switching line SWL. The switching line SWL disposed on the panel may be connected to a gate electrode of the switching transistor SWT, and the switching signal may be supplied from the gate-driving circuit. The switching signal may be supplied from a touch-driving circuit depending on the embodiment.

The pixel P may be driven differently in the display period and the touch period.

In the display period, the emission transistor ET is turned on and the scan transistor SCT is turned on. The switching transistor SWT is turned off. In the display period, a data voltage is supplied to the data line DL, thus supplying the driving power to the organic light-emitting diode OLED.

In the touch period, the emission transistor ET and the scan transistor SCT can be turned off. The switching transistor SWT can be turned on. In the touch period, a touch-driving signal is supplied to the data line DL and is then transmitted to the anode electrode AE, so that the anode electrode AE can be used as a touch electrode.

In a touch operation, the anode electrode AE may form capacitance with other electrodes. When an object approaches the anode electrode AE, the capacitance of the anode electrode AE changes and the touch-driving circuit can sense a touch by recognizing a change in the capacitance of the anode electrode AE.

In a top-emission type, in which light emitted from an organic light-emitting diode is radiated toward a cathode electrode, the capacitance of an anode electrode AE may change depending on the approach of an object. However, in a bottom-emission type, in which light emitted from an organic light-emitting diode is radiated toward an anode electrode AE, since the distance between an object and the anode electrode AE is shorter, the change in the capacitance of the anode electrode AE may be more significant. Considering that the touch recognition rate becomes higher with a greater change in capacitance, the bottom emission type may be more favorable for configuring an in-cell touch organic light-emitting display device.

A plurality of adjacent anode electrodes AE may be grouped into one touch electrode.

Figure 3:
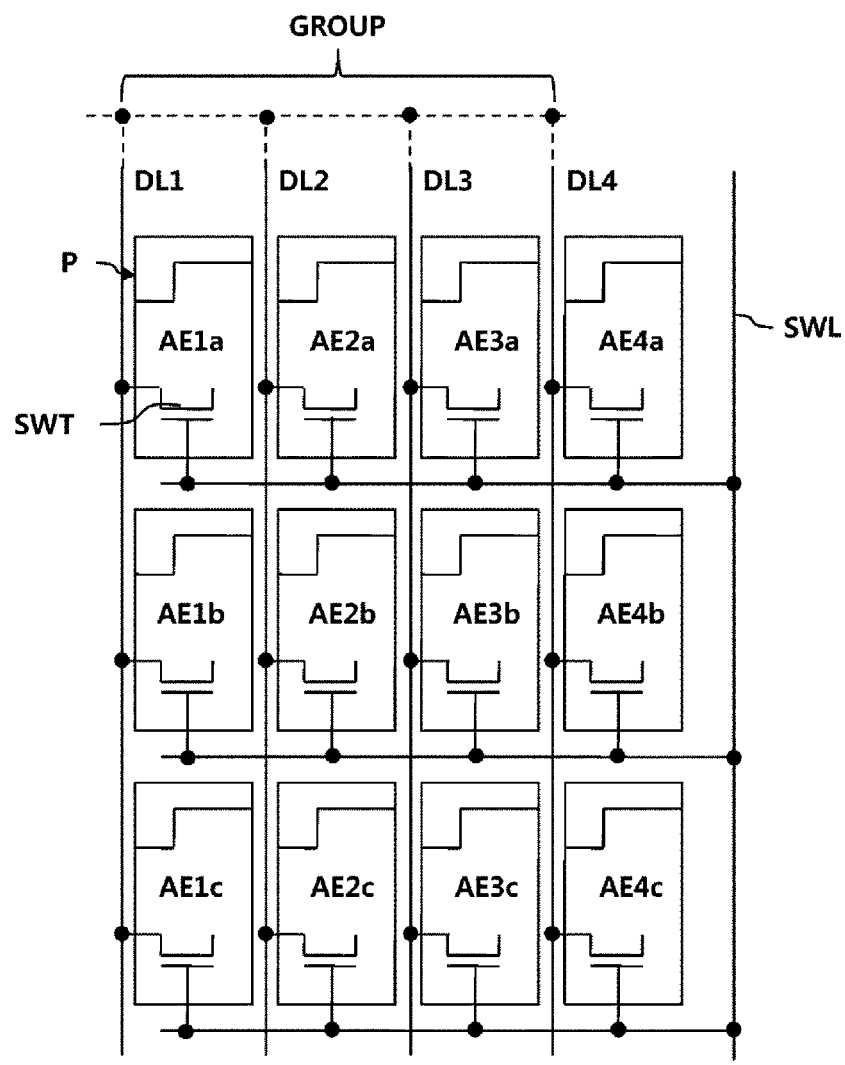
FIG. 3 illustrates a first example in which a plurality of anode electrodes is grouped into one touch electrode according to an embodiment.

FIG. 3 illustrates a first example in which a plurality of anode electrodes is grouped into one touch electrode.

Referring to FIG. 3, a touch electrode TE may include a plurality of anode electrodes AE, and switching transistors SWT connected to the respective anode electrodes AE may be connected to one common switching line SWL. The plurality of grouped switching transistors SWT may be simultaneously turned on and off in response to a single switching signal.

When the plurality of grouped switching transistors SWT is simultaneously turned on according to a switching signal, anode electrodes AE in parallel with a data line DL share the data line DL. For example, a first row of anode electrodes AE1a, AE1b, and AE1c, which are adjacent to a first data line DL1 and are arranged parallel to the first data line DL1, share the first data line DL1 according to a switching signal. When a touch-driving signal is supplied to the first data line DL1, the first row of anode electrodes AE1a, AE1b, and AE1c are driven as one touch electrode. A second row of anode electrodes AE2a, AE2b, and AE2c grouped as one touch electrode share a second data line DL2 according to a switching signal; a third row of anode electrodes AE3a, AE3b, and AE3c share a third data line DL3 according to a switching signal; and a fourth row of anode electrodes AE4a, AE4b, and AE4c share a fourth data line DL4 according to a switching signal.

In a touch period, the plurality of data lines DL1, DL2, DL3, and DL4 connected to the plurality of anode electrodes AE grouped as one touch electrode TE may be grouped within a touch-driving circuit. The touch-driving circuit may supply the same touch-driving signal to the plurality of grouped data lines DL1, DL2, DL3, and DL4.

The anode electrodes AE in parallel with the data lines DL share the data lines DL through the grouping via the switching line SWL, and the plurality of data lines DL1, DL2, DL3, and DL4 are grouped through grouping within the touch-driving circuit, thereby driving all anode electrodes AE in a group as one touch electrode TE.

Figure 4:
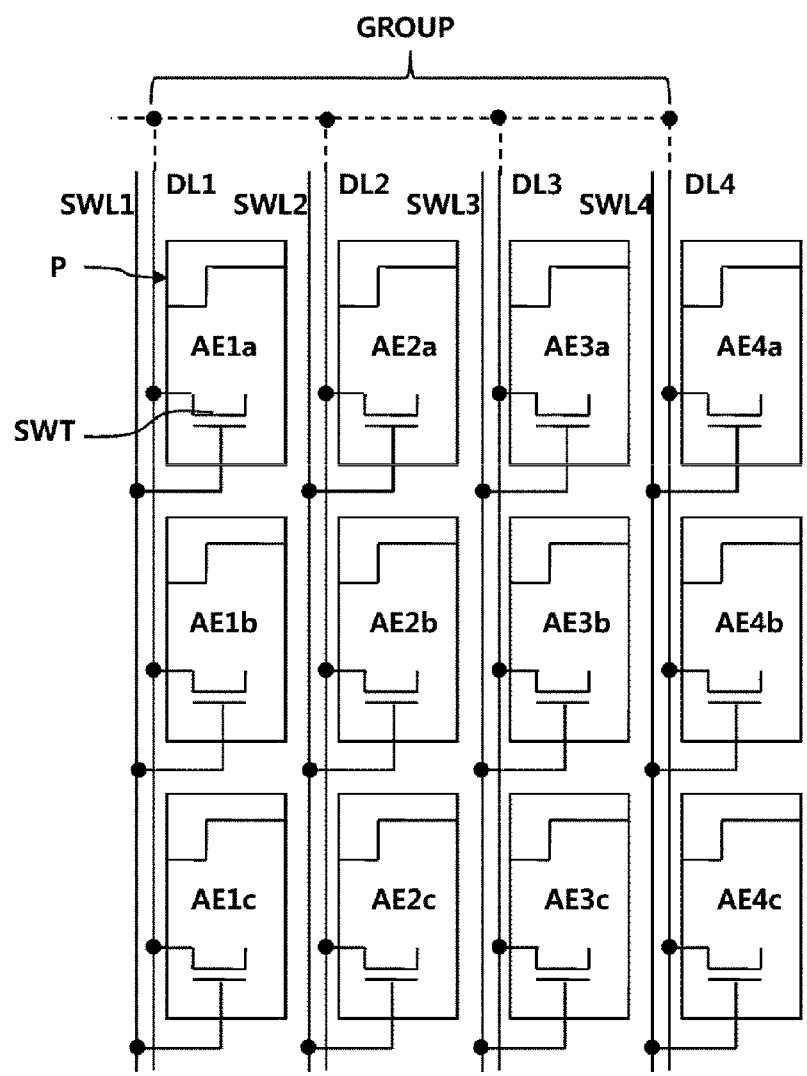
FIG. 4 illustrates a second example in which a plurality of anode electrodes is grouped into one touch electrode according to an embodiment.

FIG. 4 illustrates a second example in which a plurality of anode electrodes is grouped into one touch electrode.

Referring to FIG. 4, a touch electrode TE may include a plurality of anode electrodes AE, and switching transistors SWT connected to the respective anode electrodes AE in parallel with data lines DL may be connected to common switching lines SWL. Switching transistors SWT sharing a switching line SWL may be simultaneously turned on and off.

When the plurality of switching transistors SWT is simultaneously turned on in response to a switching signal, anode electrodes AE in parallel with a data line DL share the data line DL. For example, a first row of anode electrodes AE1a, AE1b, and AE1c, which are adjacent to a first data line DL1 and are arranged parallel to the first data line DL1, share the first data line DL1 according to a switching signal. When a touch-driving signal is supplied to the first data line DL1, the first row of anode electrodes AE1a, AE1b, and AE1c are driven as one touch electrode. A second row of anode electrodes AE2a, AE2b, and AE2c grouped as one touch electrode share a second data line DL2 according to a switching signal; a third row of anode electrodes AE3a, AE3b, and AE3c share a third data line DL3 according to a switching signal; and a fourth row of anode electrodes AE4a, AE4b, and AE4c share a fourth data line DL4 according to a switching signal.

In a touch period, the plurality of data lines DL1, DL2, DL3, and DL4 connected to the plurality of anode electrodes AE grouped as one touch electrode TE may be grouped within a touch-driving circuit. The touch-driving circuit may supply the same touch-driving signal to the plurality of grouped data lines DL1, DL2, DL3, and DL4.

The anode electrodes AE in parallel with the data lines DL share the data lines DL through the grouping via the switching line SWL, and the plurality of data lines DL1, DL2, DL3, and DL4 are grouped through grouping within the touch-driving circuit, thereby driving all anode electrodes AE in a group as one touch electrode TE.

As in FIG. 4, when switching transistors SWT are connected to a common switching line SWL for each data line DL, the size of one touch electrode array be adjusted depending on the number of data lines DL grouped in the touch-driving circuit.

Figure 5:
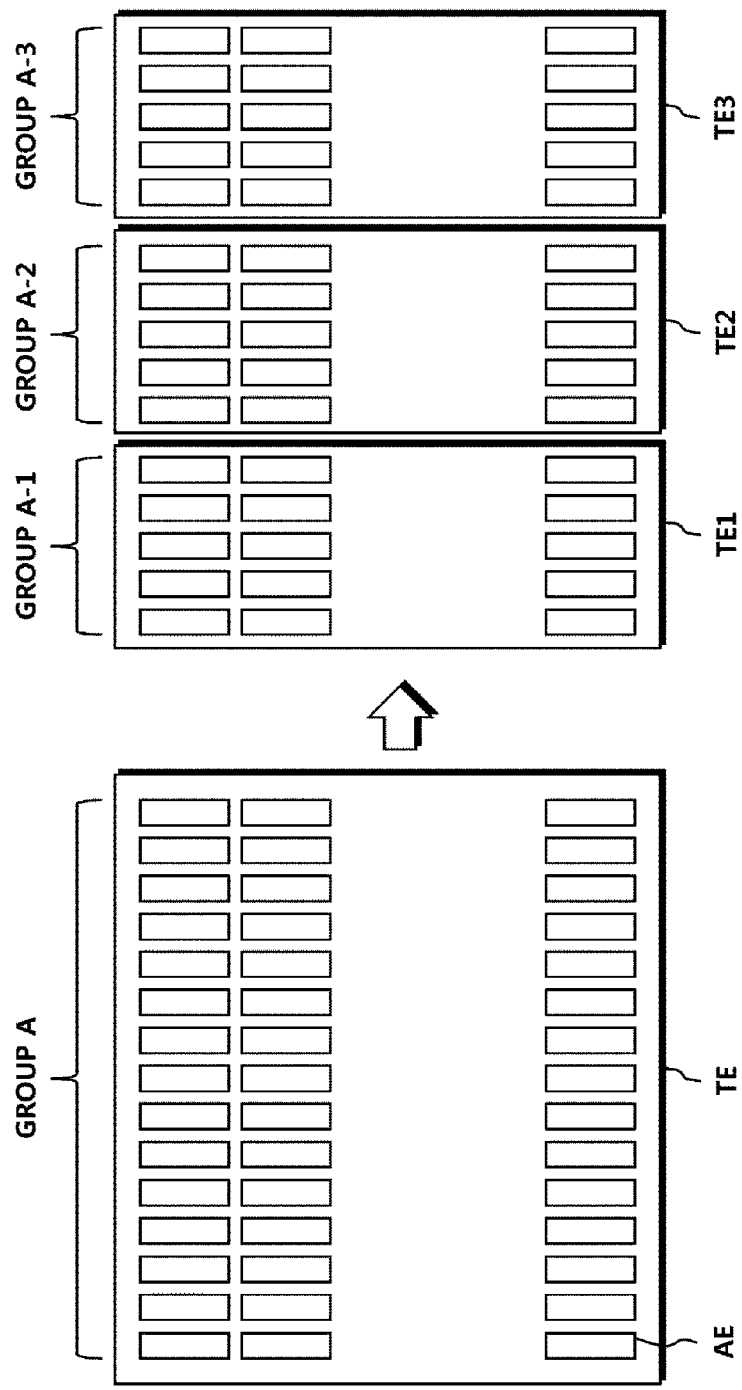
FIG. 5 illustrates adjustment of the size of a touch electrode depending on the number of grouped data lines according to an embodiment.

FIG. 5 illustrates adjustment of the size of a touch electrode depending on the number of grouped data lines.

Referring to the left side of FIG. 5, fifteen anode electrodes AE are grouped in the horizontal direction to form one touch electrode TE. A touch-driving circuit may group data lines connected to the respective fifteen anode electrodes AE arranged in the horizontal direction, that is, a direction perpendicular to the data lines, thereby forming the touch electrode.

The touch-driving circuit may control the size of a touch electrode by adjusting the number of data lines in a plurality of data lines to be grouped. Referring to the right side of FIG. 5, when the fifteen anode electrodes AE are divided into groups, each of which includes five anode electrodes AC, the one touch electrode TE is divided into three touch electrodes TE1, TE2, and TE3. With this adjustment the size of the touch electrode may be reduced to ⅓ of its original size.

The touch-driving circuit may adjust the touch resolution of a panel by adjusting the number of data lines to be grouped.

Adjusting the touch resolution may be useful, for example, in low-power operation. When the panel is in an idle mode, for example, when no touch has been detected for a long time, the touch-driving circuit may adjust the touch resolution to reduce the same, that is, may increase the size of the touch electrode. In another example, to recognize a detailed touch such as during fingerprint detection, the touch-driving circuit may increase the touch resolution. That is, the touch-driving circuit may perform control to reduce the size of the touch electrode. The size of the touch electrode may be reduced to the size of one anode electrode (AE).

The touch-driving circuit may not only adjust the number of data lines to be grouped in view of time but may also change the number of data lines to be grouped depending on the position of anode electrodes AE in view of space, thereby variously adjusting the size of touch electrodes disposed on the panel.

Figure 6:
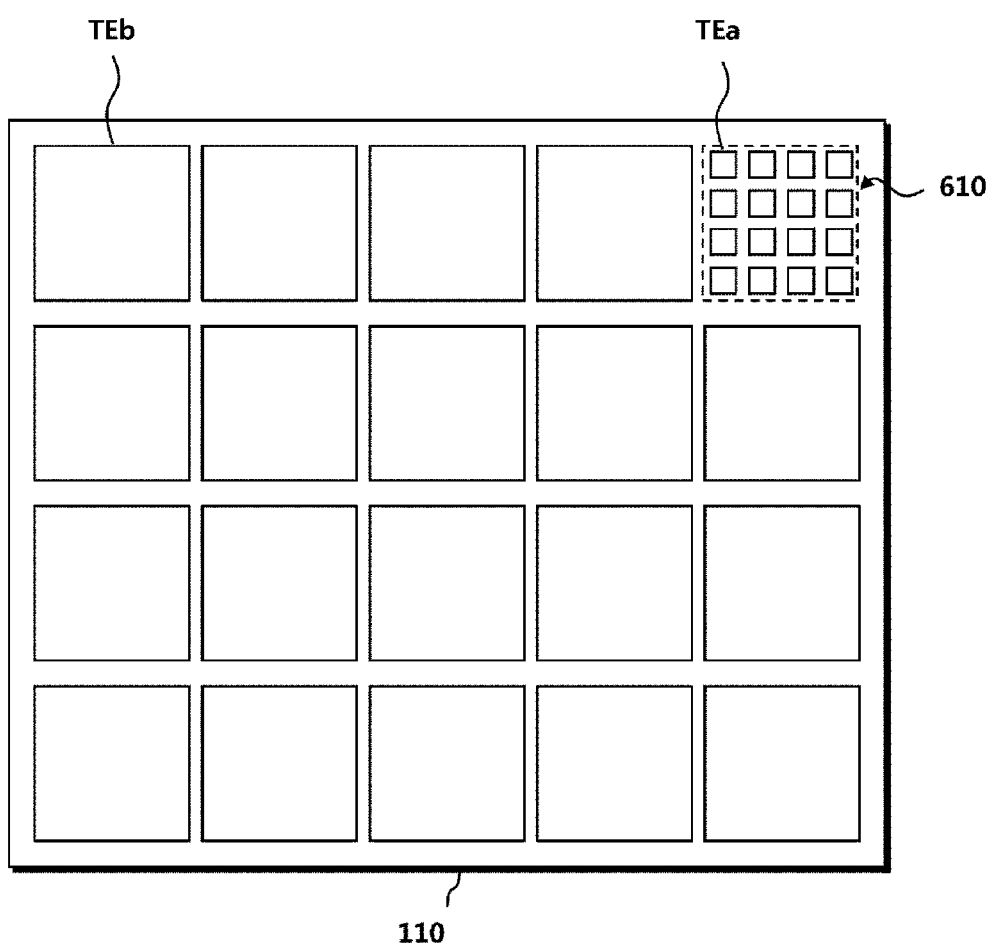
FIG. 6 illustrates touch electrodes having different sizes depending on the position thereof according to an embodiment.

FIG. 6 illustrates touch electrodes having different sizes depending on the position.

Referring to FIG. 6, the size of a touch electrode TEa disposed in a top right area 610 of a panel 110 is smaller than the size of a touch electrode TEb disposed in other areas. A touch-driving circuit may change the number of data lines to be grouped, thereby adjusting the sizes of touch electrodes disposed on the panel so that the sizes are different from each other.

This structure may be used to adjust touch resolution to be different in some areas. For example, in the embodiment of FIG. 6, this structure may be used in order to recognize a fingerprint in the top right area 610 and to sense a touch in other areas.

Since an anode electrode is used for operating an organic light-emitting diode in a display period and is used for a touch operation in a touch period, the display period and the touch period may be controlled not to overlap each other so that the operation of the organic light-emitting diode and the touch operation do not interfere with each other.

Figure 7:
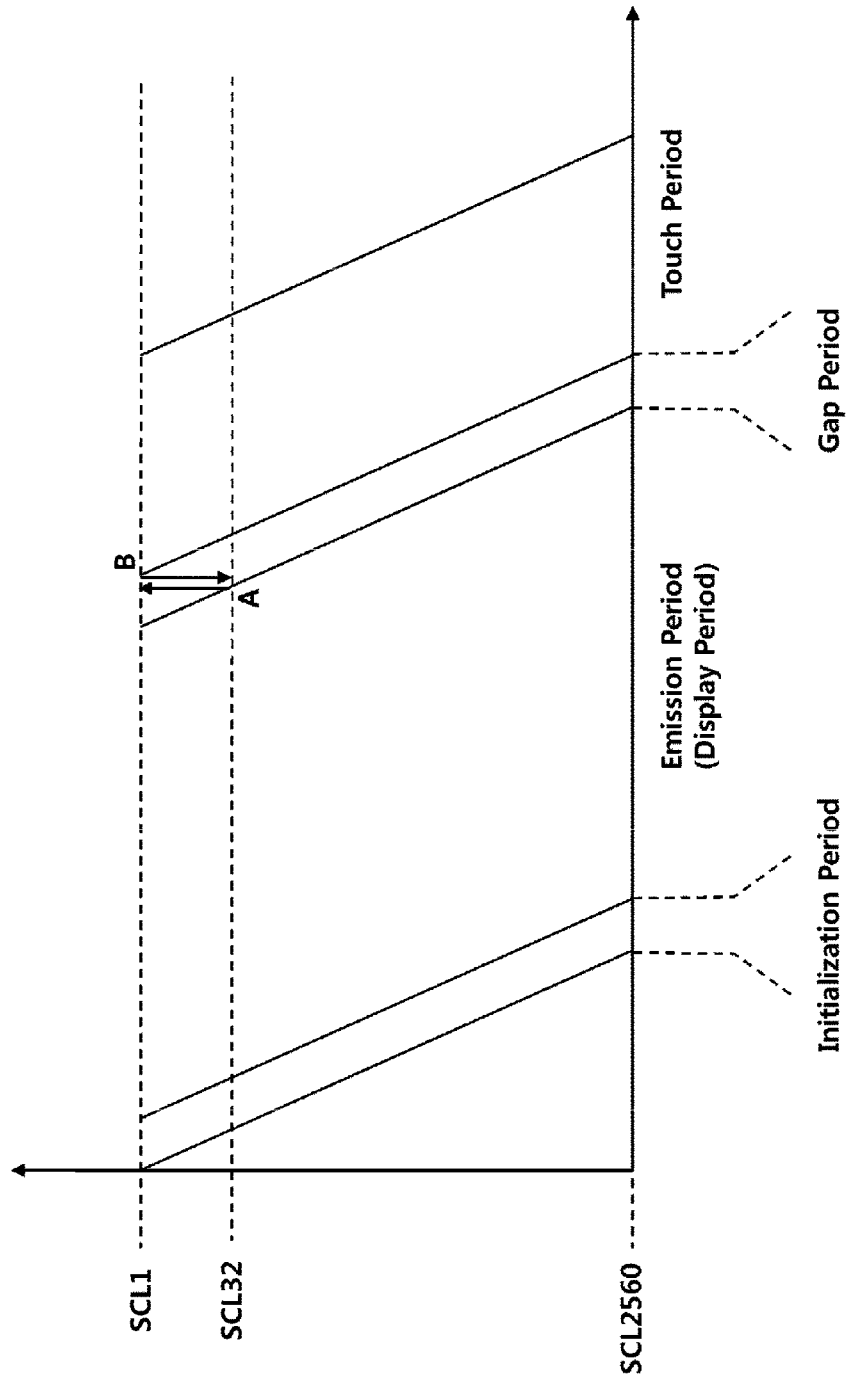
FIG. 7 illustrates a display period and a touch period of a scan line according to an embodiment.

FIG. 7 illustrates a display period and a touch period of a scan line.

Referring to FIG. 7, each scan line, that is, each pixel, sequentially has an initialization period, a display period, and a touch period.

For each scan line, the initialization period, the display period, and the touch period do not overlap each other. For example, for the same scan line, control for a display period, that is, an operation of an organic light-emitting diode, is not performed simultaneously with control for a touch period, that is, a touch operation.

When a plurality of scan lines extends on one touch electrode, that is, when anode electrodes corresponding to a plurality of scan lines are grouped as one touch electrode, a display period and a touch period for the grouped scan lines do not overlap each other.

In FIG. 7, when a first scan line to a 32nd scan line correspond to one touch electrode, the touch period start time B of a scan line in which a touch period starts first, that is, the first scan line, may be controlled to be later than the display period end time A of a scan line in which a display period ends last, that is, the 32nd scan line.

For this control, a display device, for example, a touch-driving circuit, may include a gap period between the display period and the touch period.

The touch-driving circuit may, through the gap period, control the display period and the touch period not to overlap each other for the scan lines corresponding to one touch electrode.

Figure 8:
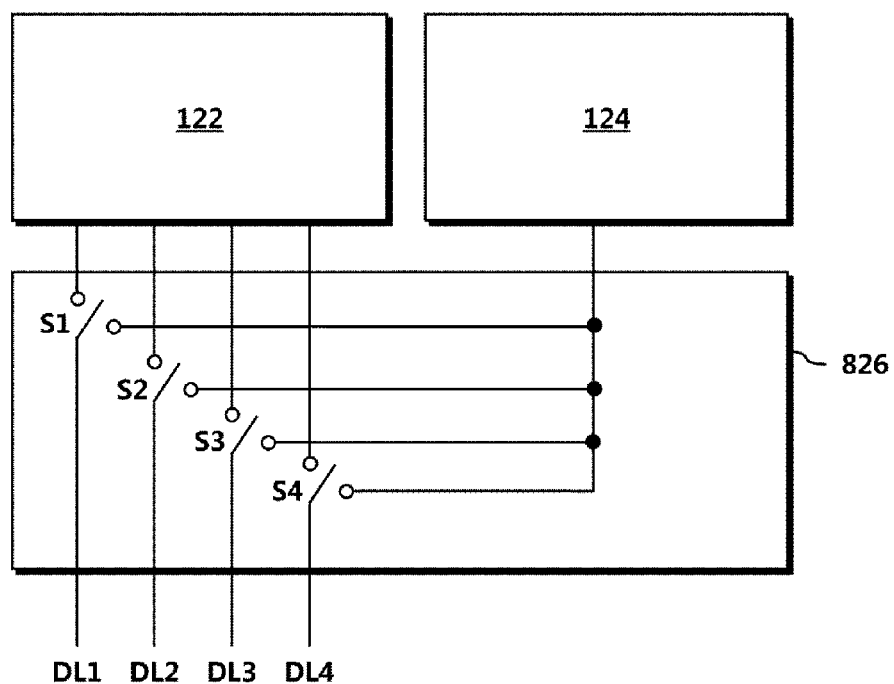
FIG. 8 illustrates the configuration of a touch display-driving circuit according to an embodiment according to an embodiment.

FIG. 8 illustrates the configuration of a touch display-driving circuit according to an embodiment.

Referring to FIG. 8, the touch display-driving circuit 120 may include a data-driving circuit 122, a touch-driving circuit 124, and an output selection circuit 826.

The data-driving circuit 122 may generate a data voltage according to image data and may supply the data voltage to a data line in a display period.

The touch-driving circuit 124 may supply a touch-driving signal to a data line connected to an anode electrode of an organic light-emitting diode disposed in each pixel and may detect the proximity or touch of an object to a panel according to a touch response signal received from the anode electrode in a touch period.

Since both the data-driving circuit 122 and the touch-driving circuit 124 output a signal through the data line DL, the output selection circuit 826 may be controlled so that the data line DL is connected to the data-driving circuit 122 or the touch-driving circuit 124 in each period.

The output selection circuit 826 may include a plurality of switches S1, S2, S3, and S4 respectively connected to the data lines DL1, DL2, DL3, and DL4. The output selection circuit 826 may control the switches S1, S2, S3, and S4 to connect the data lines DL1, DL2, DL3, and DL4 to the data-driving circuit 122 in the display period and to connect the data lines DL1, DL2, DL3, and DL4 to the touch-driving circuit 124 in the touch period.

When connecting the data lines DL1, DL2, DL3, and DL4 to the touch-driving circuit 124, the output selection circuit 826 may group and connect the data lines DL1, DL2, DL3, and DL4. Alternatively, the output selection circuit 826 may integrate the data lines DL1, DL2, DL3, and DL4 into one line and may connect the one line to the touch-driving circuit 124. The touch-driving circuit 124 may supply one touch-driving signal to the grouped data lines DL1, DL2, DL3, and DL4 and may receive one touch response signal from the data lines DL1, DL2, DL3, and DL4, thereby generating a single touch-sensing signal, for example, a touch value or capacitance variation.

The number of data lines DL1, DL2, DL3, and DL4 grouped by the output selection circuit 826 may be determined by the touch-driving circuit 124. The touch-driving circuit 124 may adjust the number of data lines DL1, DL2, DL3, and DL4 grouped by the output selection circuit 826 and may adjust the touch resolution of the panel.

A gap period may be disposed between the display period and the touch period. Here, the output selection circuit 826 may perform control so that the switches S1, S2, S3, and S4 are not connected to the data-driving circuit 122 or to the touch-driving circuit 124.

The foregoing embodiment illustrates an example in which a touch-driving signal is supplied through a data line. Hereinafter, an embodiment will be described in which a touch-driving signal is supplied through a sensing line rather than a data line.

Figure 9:
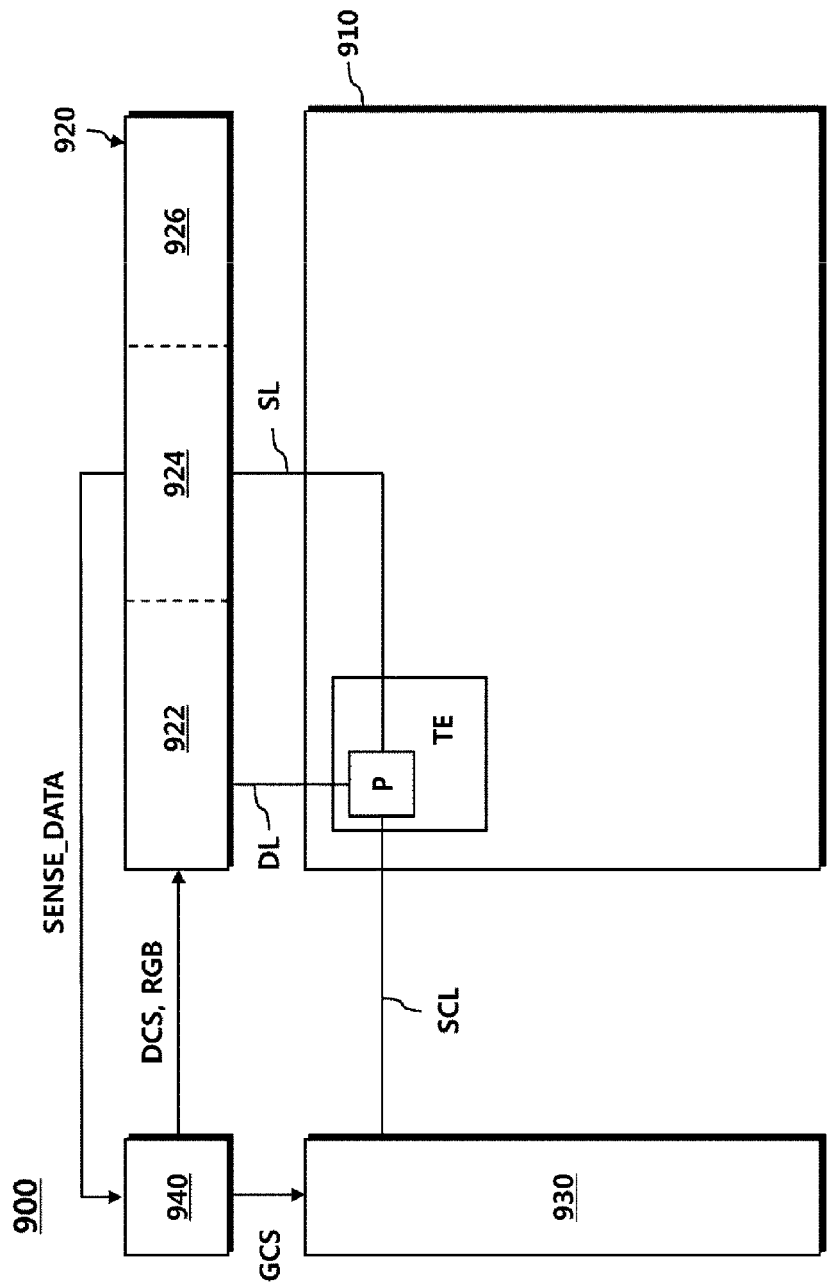
FIG. 9 schematically illustrates a display device according to another embodiment.

FIG. 9 schematically illustrates a display device according to another embodiment.

Referring to FIG. 9, the display device 900 may include a panel 910, a touch display-driving circuit 920, a gate-driving circuit 930, and a timing control circuit 940. The touch display-driving circuit 920 may include a data-driving circuit 922, a pixel-sensing circuit 924, and a touch-driving circuit 926.

A plurality of data lines DL and a plurality of scan lines SCL may be disposed in the panel 910. Also, a plurality of pixels P and a plurality of touch electrodes TE may be disposed in the panel 910.

In addition, a plurality of sensing lines SL connected to an anode electrode of an organic light-emitting diode OLED disposed in each pixel P may be disposed in the panel 910.

The panel 910 may include a display panel and a touch panel, wherein the display panel and the touch panel may share some components. Specifically, an anode electrode of an organic light-emitting diode disposed in each pixel P in the display panel may be used as the touch electrode TE for the touch panel.

The data-driving circuit 922 supplies a data voltage to the data lines DL. The data voltage may be generated according to image data (RGB) received from the timing control circuit 940.

The pixel-sensing circuit 924 is connected to an anode electrode of an organic light-emitting diode OLED disposed in each pixel P and senses the values of electrical characteristics, for example, a voltage and current, formed in each pixel P. The pixel-sensing circuit 924 may convert a sensed signal into sensing data SENSE_DATA and may transmit the sensing data to the timing control circuit 940.

The touch-driving circuit 926 may supply a touch-driving signal to the touch electrodes TE and may detect the proximity or touch of an object to the panel 910 according to a touch response signal of the touch electrode TE with respect to the touch-driving signal.

The gate-driving circuit 930 may sequentially supply a scan signal to the scan lines SCL.

The timing control circuit 940 supplies various control signals to the data-driving circuit 922, the pixel-sensing circuit 924, the touch-driving circuit 926, and the gate-driving circuit 930. Further, the timing control circuit 940 may generate a compensation value for each pixel P using the sensing data SENSE_DATA received from the pixel-sensing circuit 924 and may generate compensated image data (RGB) by applying the compensation value to an image signal received from a host.

The display device 900 may employ an anode electrode of an organic light-emitting diode disposed in each pixel P as a touch electrode TE and may sense the proximity or touch of an object to the panel 910 by detecting the capacitance of the touch electrode TE or a change in the capacitance.

Figure 10:
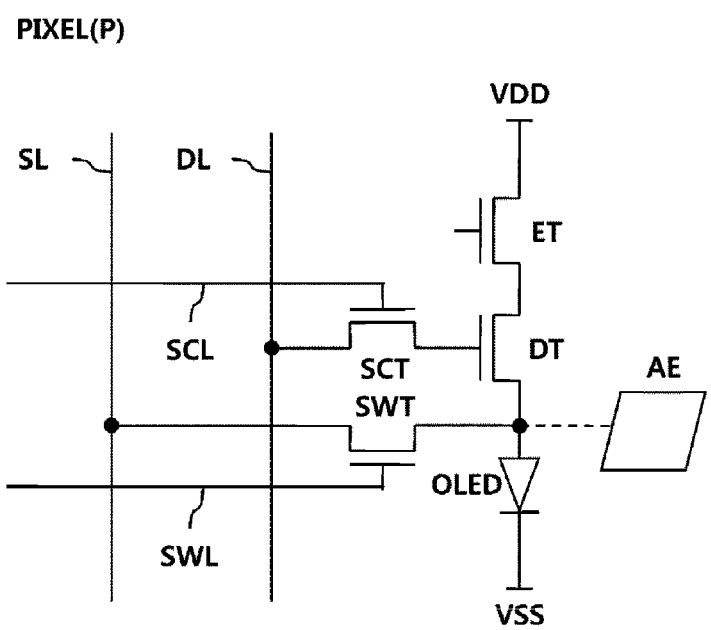
FIG. 10 illustrates the structure of a pixel according to another embodiment.

FIG. 10 illustrates the structure of a pixel according to another embodiment.

Referring to FIG. 10, an organic light-emitting diode OLED is disposed in a pixel P.

A plurality of transistors is disposed in the pixel P. Among the plurality of transistors, a driving transistor DT having one side electrically connected to an anode electrode AE of the organic light-emitting diode OLED controls driving power for the organic light-emitting diode OLED according to a data voltage supplied through a data line DL. The data voltage determines a gate-source voltage of the driving transistor DT, and the level of the driving power supplied to the organic light-emitting diode OLED through the driving transistor DT is controlled according to the gate-source voltage of the driving transistor DT. The organic light-emitting diode OLED adjust a grayscale level according to the level of the driving power.

Among the plurality of transistors disposed in the pixel P, an emission transistor ET controls connection between the pixel P and a driving power source VDD. When the emission transistor ET is turned on, the driving power source VDD may supply power to the pixel P. When the emission transistor ET is turned off, the driving power source VDD may be disconnected from the pixel P. When the emission transistor ET is turned off, the driving power source VDD stops supplying power to the pixel P, so that the organic light-emitting diode OLED is turned off. With regard to positional arrangement, the emission transistor ET may be disposed between the driving transistor DT and the driving power source VDD.

Among the plurality of transistors disposed in the pixel P, a scan transistor SCT controls connection between the data line DL and the driving transistor DT. When the scan transistor SCT is turned on, the data line DL is connected to a gate electrode of the driving transistor DT. A data voltage may be supplied to the data line DL in a display period, in which the data line DL may be connected to the gate electrode of the driving transistor DT so that the driving transistor DT may control the driving power of the organic light-emitting diode OLED. The scan transistor SCT may be controlled to be turned on and off by a scan signal supplied through a scan SCL. The scan line SCL may be connected to a gate electrode of the scan transistor SCT, and the scan signal may be supplied from a gate-driving circuit.

Among the plurality of transistors disposed in the pixel P, a switching transistor SWT controls connection between the anode electrode AE of the organic light-emitting diode OLED and a sensing line SL. When the switching transistor SWT is turned on, the sensing line SL is connected to the anode electrode AE. A touch-driving signal may be supplied to the sensing line SL in a touch period, in which the sensing line SL is connected to the anode electrode AE so that the touch-driving signal is supplied to the anode electrode AE, and the anode electrode AE may be used as a touch electrode. The switching transistor SWT may be controlled to be turned on and off by a switching signal supplied through a switching line SWL. The switching line SWL disposed on the panel may be connected to a gate electrode of the switching transistor SWT, and the switching signal may be supplied from the gate-driving circuit. The switching signal may be supplied from a touch-driving circuit depending on the embodiment.

The pixel P may be driven differently in the display period, the sensing period, and the touch period.

In the display period, the emission transistor ET is turned on and the scan transistor SCT is turned on. The switching transistor SWT is turned off. In the display period, a data voltage is supplied to the data line DL, thus supplying the driving power to the organic light-emitting diode OLED.

In the sensing period, the emission transistor ET is turned on, the scan transistor SCT can be turned on or off as needed, and the switching transistor SWT is turned on. In the sensing period, the sensing line SL is connected to a pixel-sensing circuit, and the pixel-sensing circuit may receive a sensing signal for measuring the characteristic value of the pixel P through the sensing line SL. The pixel-sensing circuit may measure the threshold voltage or mobility of the driving transistor DT or measure the characteristics of the organic light-emitting diode OLED using the sensing signal.

In the touch period, the emission transistor ET and the scan transistor SCT can be turned off. The switching transistor SWT can be turned on. In the touch period, a touch-driving signal is supplied to the sensing line SL and is then transmitted to the anode electrode AE, so that the anode electrode AE can be used as a touch electrode.

In a touch operation, the anode electrode AE may form capacitance with other electrodes. When an object approaches the anode electrode AE, the capacitance of the anode electrode AE changes and the touch-driving circuit can sense a touch by recognizing a change in the capacitance of the anode electrode AE.

A plurality of adjacent anode electrodes AE may be grouped into one touch electrode.

Figure 11:
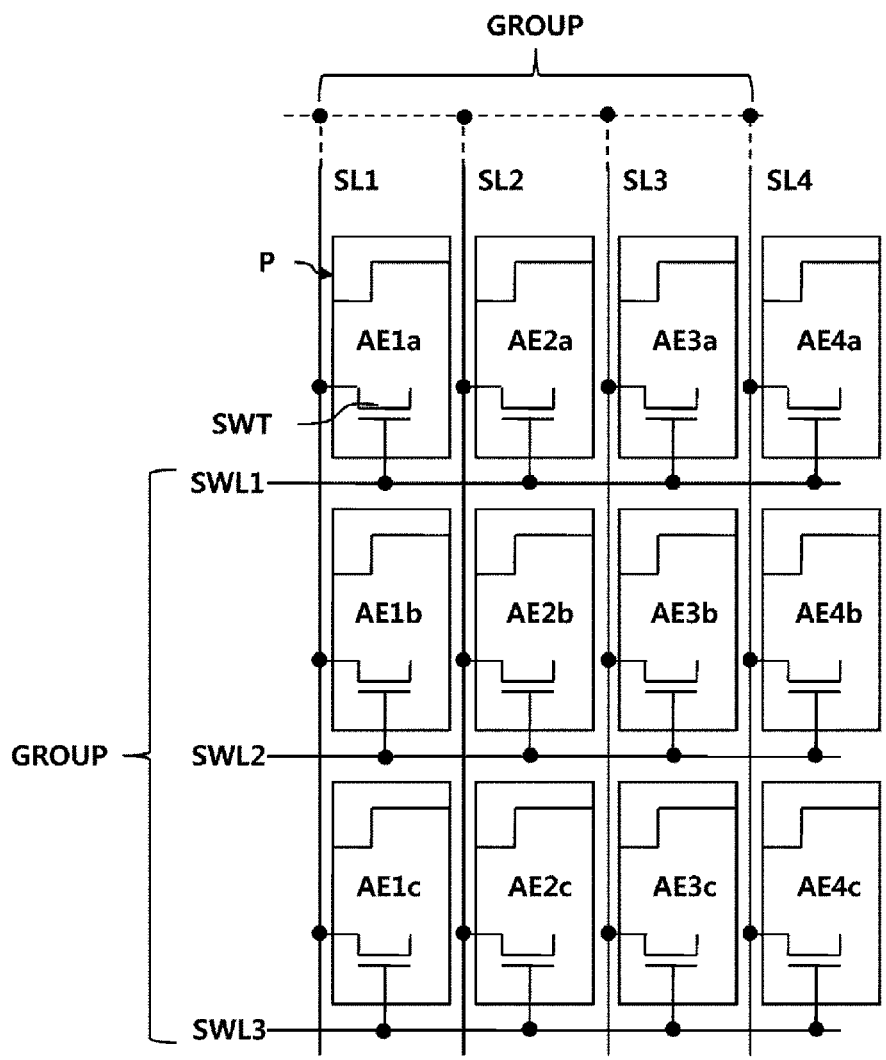
FIG. 11 illustrates a third example in which a plurality of anode electrodes is grouped into one touch electrode according to an embodiment.

FIG. 11 illustrates a third example in which a plurality of anode electrodes is grouped into one touch electrode.

Referring to FIG. 11, a touch electrode TE may include a plurality of anode electrodes AE, and switching transistors SWT connected to the respective anode electrodes AE may be simultaneously turned on and off according to one common switching signal or a plurality of synchronized switching signals.

The switching transistors SWT disposed in the plurality of anode electrodes AE may be connected to a plurality of switching lines SWL1, SWL2, and SWL3. For example, a switching transistor SWT disposed in a first row of anode electrodes AE1a, AE2a, AE3a, and AE4a may be connected to a first switching line SWL1; a switching transistor SWT disposed in a second row of anode electrodes AE1b, AE2b, AE3b, and AE4b may be connected to a second switching line SWL2; and a switching transistor SWT disposed in a third row of anode electrodes AE1c, AE2c, AE3c, and AE4c may be connected to a third switching line SWL3.

One switching signal or a plurality of synchronized switching signals may be supplied to the plurality of switching lines SWL1, SWL2, and SWL3. Accordingly, the switching transistors SWT connected to the different switching lines SWL may be simultaneously turned on and turned off.

The switching lines SWL may commonly connect the switching transistors SWT in a direction intersecting a sensing line SL which is substantially parallel to a scan line, that is, in the horizontal direction in FIG. 11.

In a touch period, a plurality of sensing lines SL1, SL2, SL3, and SL4 connected to the plurality of anode electrodes AE grouped as one touch electrode TE may be grouped within a touch-driving circuit. The touch-driving circuit may supply the same touch-driving signal, that is, a single touch-driving signal or a plurality of synchronized touch-driving signals, to the plurality of grouped sensing lines SL1, SL2, SL3, and SL4.

When the switching lines SWL simultaneously turn on the switching transistors SWT in the direction intersecting the sensing line SL and the touch-driving circuit supplies the same touch-driving signal to the plurality of grouped sensing lines SL1, SL2, SL3, and SL4, a plurality of anode electrodes AE corresponding to one switching line SWL may operate as one touch electrode.

For example, the anode electrodes AE1a, AE2a, AE3a, and AE4a in the first row corresponding to the first switching line SWL1 operate as one touch electrode; the anode electrodes AE1b, AE2b, AE3b, and AE4b in the second row corresponding to the second switching line SWL2 also operate as one touch electrode; and the anode electrodes AE1c, AE2c, AE3c, and AE4c in the third row corresponding to the third switching line SWL3 also operate as one touch electrode.

In this structure, when the plurality of switching lines SWL1, SWL2, and SWL3 is grouped and operated by the same switching signal, all of the grouped anode electrodes AE1a to AE4c may also operate as one touch electrode.

The display device may adjust the number of grouped sensing lines SL and the number of grouped switching lines SWL, thereby adjusting the size of a touch electrode or the touch resolution of a panel.

The embodiments have been described above. According to these embodiments, an organic light-emitting display device may be configured in an in-cell type. Accordingly, the overall thickness of a panel of the organic light-emitting display device may be reduced, and manufacturing costs may be reduced.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. An organic light-emitting display device comprising:
   a panel including pixels, in each of which a driving transistor, configured to control a driving power for an organic light-emitting diode according to a data voltage supplied through a data line, a switching transistor, configured to control a connection between an anode electrode of the organic light-emitting diode and a sensing line, an emission transistor, configured to control a connection between the driving transistor and a driving power source, and a scan transistor, configured to control a connection between the driving transistor and the data line, are disposed; and
   a driving circuit configured to supply the data voltage to the driving transistor through the data line in a display period, to receive a sensing signal for measuring a characteristic value of the pixel through the sensing line in a sensing period and to supply a touch-driving signal to the sensing line connected to the anode electrode by the switching transistor in a touch period,
   wherein the emission transistor is turned on, the scan transistor is turned on, and the switching transistor is turned off in the display period,
   wherein the emission transistor is turned on, the scan transistor is turned on or off, and the switching transistor is turned on in the sensing period, and
   wherein the emission transistor is turned off, the scan transistor is turned off, and the switching transistor is turned on in the touch period.

2. The organic light-emitting display device of claim 1, wherein a switching line connected to a gate electrode of the switching transistor is disposed on the panel, the switching transistor is controlled by a switching signal supplied through the switching line.

3. The organic light-emitting display device of claim 1, wherein a plurality of adjacent anode electrodes are grouped into one touch electrode, and the driving circuit supplies the same touch-driving signal to a plurality of grouped sensing lines connected to a plurality of anode electrodes grouped as one touch electrode in the touch period.

4. The organic light-emitting display device of claim 3, wherein the driving circuit adjusts a size of one touch electrode by adjusting a number of grouped sensing lines in a plurality thereof.

5. The organic light-emitting display device of claim 3, wherein the driving circuit differently adjusts sizes of touch electrodes disposed on the panel by differently adjusting numbers of grouped sensing lines in pluralities thereof.

6. The organic light-emitting display device of claim 1, wherein the driving circuit comprises a gap period between the display period and the touch period.

7. The organic light-emitting display device of claim 6, wherein a plurality of adjacent anode electrodes is grouped into one touch electrode, and the driving circuit controls the display period and the touch period not to overlap each other for scan lines corresponding to one touch electrode through the gap period.

8. A driving circuit comprising:
   a data-driving circuit configured to generate a data voltage according to image data and to supply the data voltage to a data line in a display period; and
   a pixel-sensing circuit configured to receive a sensing signal for measuring a characteristic value of a pixel through a sensing line in a sensing period;
   a touch-driving circuit configured to supply a touch-driving signal to the sensing line connected to an anode electrode of an organic light-emitting diode disposed in each pixel and to sense a proximity or touch of an object to a panel according to a touch response signal received from the anode electrode in a touch period,
   wherein the each pixel includes a driving transistor, configured to control a driving power for the organic light-emitting diode according to the data voltage supplied through the data line, a switching transistor, configured to control a connection between the anode electrode and the sensing line, an emission transistor, configured to control a connection between the driving transistor and a driving power source, and a scan transistor, configured to control a connection between the driving transistor and the data line,
   wherein the emission transistor is turned on, the scan transistor is turned on, and the switching transistor is turned off in the display period,
   wherein the emission transistor is turned on, the scan transistor is turned on or off, and the switching transistor is turned on in the sensing period, and
   wherein the emission transistor is turned off, the scan transistor is turned off, and the switching transistor is turned on in the touch period.

9. The driving circuit of claim 8, wherein the touch-driving circuit connects a plurality of sensing lines to be grouped and generates one touch-sensing signal from the plurality of grouped data lines in the touch period.

10. The driving circuit of claim 9, wherein the touch-driving circuit adjusts a touch resolution of the panel by adjusting a number of the plurality of grouped sensing lines.

11. The driving circuit of claim 8, wherein a gap period is disposed between the display period and the touch period.

12. The organic light-emitting display device of claim 1, wherein switching transistors connected to a plurality of anode electrodes grouped as one touch electrode are simultaneously turned on according to a gate signal in the touch period.

\* \* \* \* \*